Patented May 22, 1951

2,553,993

UNITED STATES PATENT OFFICE 2,553,993

PYRIDINE THERAPEUTIC COMPOUNDS

Heinz M. Wuest, Montclair, N. J., assignor to Warner-Hudnut, Inc., New York, N. Y., a corporation of Delaware No Drawing. Application March 31, 1949, Serial No. 84,739

4 Claims. (Cl. 260—297)

This invention relates to new pharmaceutical products, specifically to products having physostigmine-like action, capable of stimulating the parasympathetic nervous system.

In accordance with this invention, there are provided quaternary salts having the structural formula

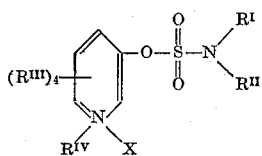

in which $R^I$ and $R^{II}$ denote alkyl, aralkyl, aryl, halogenated aryl or hydroaryl hydrocarbon radicals, which may be the same or different, and each of which preferably contains not over ten carbon atoms, or together denote a polymethylene radical containing not over five carbon atoms; $R^{III}$ denotes hydrogen, a lower aliphatic or araliphatic hydrocarbon radical, containing not over ten carbon atoms, or halogen, said members being the same or different; $R^{IV}$ denotes an organic quaternizing radical; and X denotes a quaternizing anion. These compounds, I have found, display typical physostigmine-like action; for example, in vivo tests on dogs have established they effectively stimulate peristalsis.

The compounds of my invention may be prepared readily by reacting a 3-pyridol with a compound having the structural formula

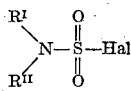

in which $R^I$ and $R^{II}$ are as above defined, and Hal denotes a halogen atom, e. g. chlorine or bromine, and then converting the sulfamic acid ester formed to the desired quaternary compound. The term "a 3-pyridol" is used herein to denote not only the specific compounds of the structural formula

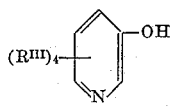

in which $R^{III}$ is as above defined, such as 6-methylpyridine-3-ol, 2,6-dimethylpyridine-3-ol, 2,4,6-trimethylpyridine-3-ol, 6-benzyl-2,5-dimethylpyridine-3-ol, 6-styrylpyridine-3-ol, and halogen substituted 3-pyridols such as 2-iodopyridine-3-ol, or 2-chlorpyridine-3-ol. The sulf-amyl halide reacted with the 3-pyridol may be any compound of the formula

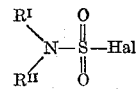

such as dimethylaminosulfuryl chloride, diphenylaminosulfuryl chloride, (N-methyl-N-p-chlorphenyl) aminosulfuryl chloride, (N-methyl-N-benzyl) aminosulfuryl chloride, (N-methyl-N-cyclohexyl) aminosulfuryl chloride, (N-methyl-N-cyclohexenyl) aminosulfuryl chloride, or tetramethyleneaminosulfuryl chloride; corresponding bromides or iodides may also be used. The compound employed to quaternize the sulfamic acid esters thus prepared may be any suitable compound, such as, for example, alkyl, alkylene, or hydroxyalkyl halides, e. g. methyl chloride, methyl bromide, n-propyl chloride, allyl or methallyl bromide, or beta-hydroxyethyl chloride; aralkyl halides, e. g. benzyl, phenylethyl or naphthylmethyl chlorides or bromides, their methoxy, ethoxy, halo or nitro derivatives; or thienylmethyl halides such as thienylmethyl chloride or thienylmethyl bromide. The quaternizing compound is preferably one giving a primary radical in which the nitrogen atom of the ring is connected to a —CH₂— group.

My invention also comprises production of bis type compounds, i. e. compounds such as methylene-bis-(1-(3-dimethylaminosulfamyloxy)-pyridinium chloride) or 1,2-ethylene-bis-(1-(3-dimethylaminosulfamyloxy)-pyridinium bromide), by reaction of a methylene halide or a 1,2-ethylene halide with a compound of the formula

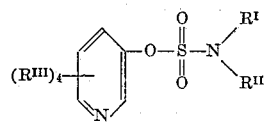

In these compounds, for the purposes of this invention, either half of the bis compound may be considered as the sulfamyloxy-pyridinium radical in the generic formula above set forth, and the second half, together with the connecting alkylene radical, as the quaternizing cation.

The unquaternized tertiary amines prepared in accordance with this invention, i. e. the compounds of the formula

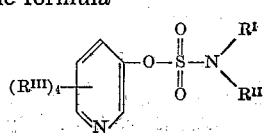

are new compounds which are valuable intermediates in the preparation of the pharmaceutically active compounds of our invention; hence these tertiary amines are intended to be included within the scope of this invention.

The preferred compounds of my invention are the benzyl quaternary salts of the dimethylsulfamate of 3-pyridol, since I have found these compounds have particularly effective physostigmine-like action.

In the preparation of the compounds of my invention, the reaction of the 3-pyridol and the sulfamyl halide may be carried out at any suitable temperature, e. g. about 80° C., in a solvent such as benzene and in the presence of an acid binding agent, such as triethylamine, to absorb the hydrogen halide evolved, the desired ester then being recovered by fractionation. The reaction of the sulfamate to form the quarternary compound may be carried out in the presence of a solvent such as benzene at any suitable temperature, e. g. room temperature to 80° C., and the new product recovered and, if desired, purified by recrystallization.

The products of my invention may be administered parenterally in the form of aqueous solutions or orally in the form of tablets. Extensive pharmacological tests have established that the compounds of my invention possess physostigmine-like properties in that they have the characteristic high toxicity of such drugs and, when tested in vivo, promote intestinal motility.

As above noted the preferred compounds of my invention are the benzyl quaternary salts of the dimethylsulfamate of 3-pyridol such as 1-benzyl-3-(dimethylsulfamyloxy) - pyridinium bromide, 1-benzyl-3-(dimethylsulfamyloxy) - pyridinium chloride, 1 - benzyl-3-(dimethylsulfamyloxy)-pyridinium dihydrogen phosphate and 1-benzyl-3-(dimethylsulfamyloxy) - pyridinium picrate. Among the other compounds prepared in accordance with my invention may be mentioned the following: 3-(dimethylsulfamyloxy)-1-methyl-pyridinium bromide; 3-(dimethylsulfamyloxy)-1-methyl-pyridinium chloride; 3-(dimethylsulfamyloxy) - 1 - methyl - pyridinium picrate; 3-(dimethylsulfamyloxy) - 1,2,6-trimethyl - pyridinium bromide; 1 - benzyl-3-(tetramethylenesulfamyloxy) - pyridinium bromide; 1-benzyl-3-(dimethylsulfamyloxy) -6 - methyl - pyridinium bromide; 1 - benzyl - 3 - (N-methyl-N-p-chlorphenylsulfamyloxy)-pyridinium bromide; 1-(p-methoxybenzyl) - 3 - (dimethylsulfamyloxy) - pyridinium bromide; 3-(dimethylsulfamyloxy)-1-(p-nitrobenzyl)-pyridinium bromide; 1-benzyl-3-(N-benzyl-N-methylsulfamyloxy) - pyridinium bromide; 1 - benzyl-3-(N-methyl-N-cyclohexylsulfamyloxy)-pyridinium bromide; 1 - benzyl-3-(N - methyl-N-cyclohexenylsulfamyloxy) - pyridinium bromide; 1-benzyl-3-(dimethylsulfamyloxy) - 6 - styryl - pyridinium bromide; 3 - (dimethylsulfamyloxy) - 1 - (2 - naphthylmethyl)-pyridinium bromide; 3-(dimethylsulfamyloxy) - 2-iodo-1-methyl-pyridinium iodide; 3-(dimethylsulfamyloxy)-1-(phenylethyl)-pyridinium bromide; 3-(dimethylsulfamyloxy) - 1 - (2-thienylmethyl)-pyridinium chloride; and 1,2-ethylenebis-(1 - (3 - dimethylsulfamyloxy) - pyridinium bromide.

The following examples are illustrative of the preparation of compounds of my invention:

*Example 1*

30.2 g. of dimethylaminosulfuryl chloride and 40.5 g. of triethylamine were rapidly added to a refluxing solution of 19 g. of 3-pyridol in a liter of benzene, and refluxing was continued for an additional five hours. The triethylamine hydrochloride was removed by filtration and solvents distilled from the filtrate. The residual oil was then fractionated under vacuum, a product distilling at 117–120° C. at 1 mm. being obtained. Upon analysis, this product was found to be the desired 3-(N-dimethylsulfamyloxy)-pyridine.

6.06 g. of the product prepared as above described were dissolved in 50 cc. of benzene, 7.7 g. of benzyl bromide were added and the mixture refluxed for five hours. The solid which formed was recovered by filtration and recrystallized from a mixture of absolute alcohol and ether. A colorless solid having a melting point of 155° C. was obtained. Upon analysis, this product was found to be the 1-benzyl-3-(N-dimethylsulfamyloxy)-pyridinium bromide.

*Example 2*

6.8 g. of 3-(N-dimethylsulfamyloxy) - pyridine prepared as described in Example 1 were dissolved in 20 cc. of benzene and the resulting solution was added to a solution of 5.7 g. of methyl bromide in 20 cc. of benzene. The mixture was then introduced into a pressure bottle and permitted to stand over night. At the end of that time, the bottle was opened and the mixture refluxed for 30 minutes. The solid material which formed was removed by filtration and recrystallized from a mixture of absolute alcohol and ether, colorless crystals having a melting point of 157–158° C. being recovered. Upon analysis this product was found to be 1-methyl-3-(N-dimethylsulfamyloxy)-pyridinium bromide.

In like manner other compounds coming within the scope of this invention may be prepared by substituting in the processes of the above examples equivalent quantities of the appropriate sulfamyl halide, 3-pyridol and quaternizing compound.

Since certain changes may be made in the compounds above described without departing from the scope of my invention, it is intended that all matter contained in the above description shall be interpreted as illustrative and not in a limiting sense.

I claim:

1. A compound selected from the group consisting of compounds having the structural formula

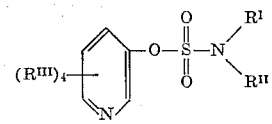

and their organic quaternary pyridinium salts, in which $R^I$ and $R^{II}$ denote a radical selected from the group consisting of alkyl, aralkyl, aryl, halogenated aryl and hydroaryl hydrocarbon radicals, and together denote a polymethylene radical containing not over five carbon atoms; and $R^{III}$ denotes a member selected from the group consisting of hydrogen, lower aliphatic and araliphatic hydrocarbon radicals, and halogen.

2. The compound 1-benzyl - 3 - (N - dimethylsulfamyloxy)-pyridinium bromide, having the structural formula

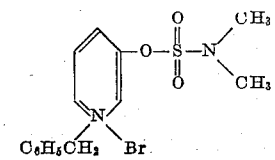

3. The compound 1-methyl-3-(N-dimethyl-sulfamyloxy)-pyridinium bromide, having the structural formula
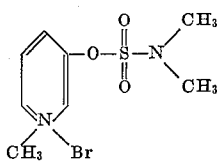
4. The compound 3-(N-dimethylsulfamyloxy)-pyridine, having the structural formula
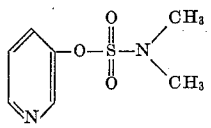
HEINZ M. WUEST.
No references cited.